US00RE43705E

(19) United States
(12) Reissued Patent
Sherman

(10) Patent Number: US RE43,705 E
(45) Date of Reissued Patent: Oct. 2, 2012

(54) METHOD AND SYSTEM FOR OPTIMALLY SERVING STATIONS ON WIRELESS LANS USING A CONTROLLED CONTENTION/RESOURCE RESERVATION PROTOCOL OF THE IEEE 802.11E STANDARD

(75) Inventor: Matthew J. Sherman, Succasunna, NJ (US)

(73) Assignee: AT&T Intellectual Property II, LP., Reno, NV (US)

(21) Appl. No.: 12/587,884

(22) Filed: Oct. 15, 2009

Related U.S. Patent Documents

Reissue of:
(64) Patent No.: 7,289,529
Issued: Oct. 30, 2007
Appl. No.: 10/230,116
Filed: Aug. 29, 2002

U.S. Applications:
(60) Provisional application No. 60/335,504, filed on Oct. 31, 2001.

(51) Int. Cl.
*H04L 12/417* (2006.01)

(52) U.S. Cl. ..... 370/461; 370/462

(58) Field of Classification Search ..... None
See application file for complete search history.

(56) References Cited

U.S. PATENT DOCUMENTS

| | | | | |
|---|---|---|---|---|
| 6,282,187 | B1 | 8/2001 | Evans et al. | |
| 6,285,665 | B1 | 9/2001 | Chuah | |
| 6,567,416 | B1 | 5/2003 | Chuah | |
| 6,804,222 | B1 * | 10/2004 | Lin et al. | 370/338 |
| 6,850,981 | B1 * | 2/2005 | Ho et al. | 709/227 |
| 7,031,287 | B1 * | 4/2006 | Ho et al. | 370/338 |
| 7,068,633 | B1 * | 6/2006 | Ho | 370/338 |
| 2005/0041670 | A1 * | 2/2005 | Lin et al. | 370/395.21 |
| 2008/0049761 | A1 * | 2/2008 | Lin et al. | 370/395.21 |
| 2010/0080188 | A1 * | 4/2010 | Ho et al. | 370/329 |
| 2010/0080196 | A1 * | 4/2010 | Ho et al. | 370/336 |
| 2010/0085933 | A1 * | 4/2010 | Ho et al. | 370/329 |

OTHER PUBLICATIONS

J. Grier, *Wireless LANs—Implementing InterOperable Networks*, Macmillan Technical Publishing, (International Standard Book No. 1-57870-081-7), Chapter 3, pp. 89-125 (1999).

R. O'Hara and A. Petrick, *The IEEE 802.11 Handbook—A Designer's Companion*, IEEE, New York, NY (ISBN 07381-1855-9) pp. 7-19 (1999).

(Continued)

*Primary Examiner* — Robert Scheibel
*Assistant Examiner* — Duc Duong

(57) ABSTRACT

A method for optimally serving Stations (STA) on Wireless Local Area Network (LAN) using a Controlled Contention/Resource Reservation protocol of the IEEE 802.11e standard. The Wireless LAN includes multiple STAs, mobile or Stationary, airlinked to an access point as a Basic Service Set (BSS). A Hybrid Coordinator (HC) is co-located with the access point for allocating the bandwidth for the BSS using a Controlled Contention/Resource Reservation protocol defined in the IEEE Standard 802.11(e). The HC transmits Contention Control (CC) frames and initiates Controlled Contention Intervals (CCI) having a selected number of slotted intervals. HC receives Resource Reservations (RR) detailing bandwidth needs from STA contenders during a specified time interval called the Controlled Contention Interval (CCI.). Several parameters are installed in each CC for contention control purpose. The several parameters are controlled to optimize efficient use of the wireless medium and reduce access delays for RR frames contending for the wireless medium.

10 Claims, 13 Drawing Sheets

CC/RR Protocol

OTHER PUBLICATIONS

Takahiro Suzuki et al, "Performance Evaluation of Priority-based Multimedia Transmission with the PCF in an IEEE 802.11 Standard Wireless LAN," *Proceedings of the IEEE 12th International Symposium on Personal, Indoor and Mobile Radio Communications*, Sep. 30 through Oct. 3, 2001.

Takahiro Suzuki, Shuji Tasaka, "Performance Evaluation of Multimedia Transmission with the PCF of the IEEE 802.11 Standard MAC Protocol", Technical Study Report of The Institute of Electronic, Information and Communication Engineers (IEICE) IN2000-144, vol. 100, No. 456, pp. 67-72, The Institute of Electronic, Information and Communication Engineers, Nov. 15, 2000.

* cited by examiner

Figure 2A CC/RR Protocol

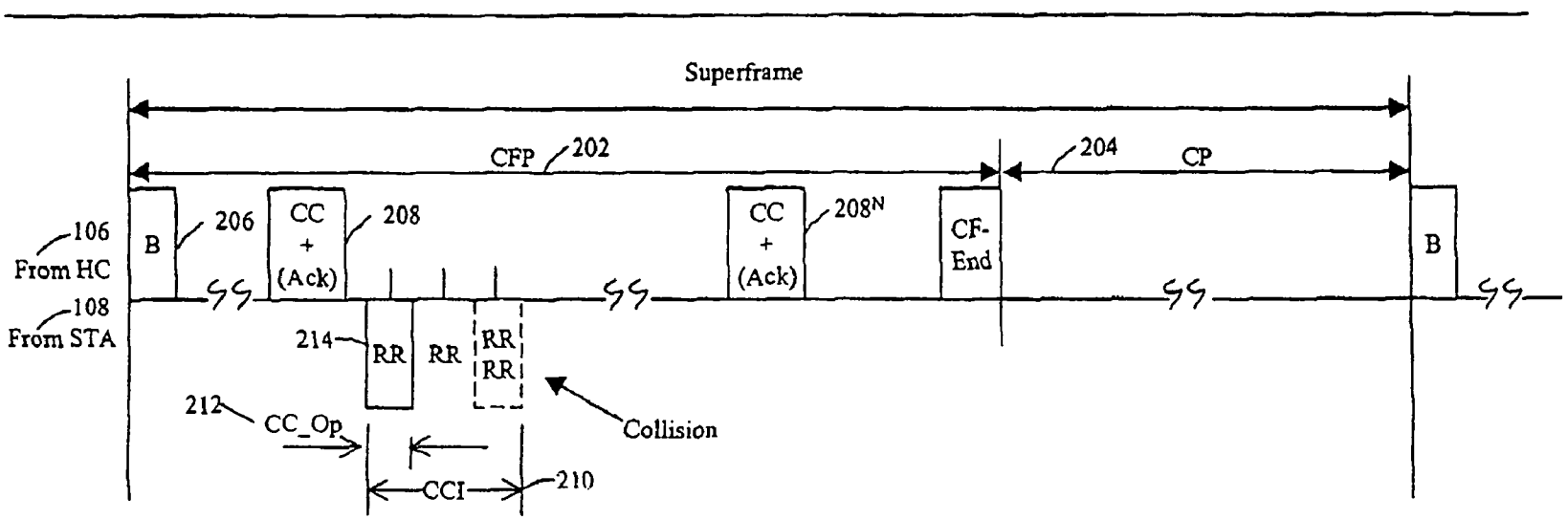

Legend:
B - 802.11 Beacon (Starts CFP)
CC - Contention Control Frame
RR - Resource Reservation Frame
CF-End - Contention Free End Frame
CFP - 802.11 Contention Free Period
CP - 802.11 Contention Period
(Ack) - Some frame may include implied Acknowledgement of prior frames
Superframe - 802.11e construct consisting of period between CFP
CC_Op - Controlled Contention Opportunity
CCI - Controlled Contention Interval Figure 3 Efficiency of Single CCI Servicing 95% of Contenders
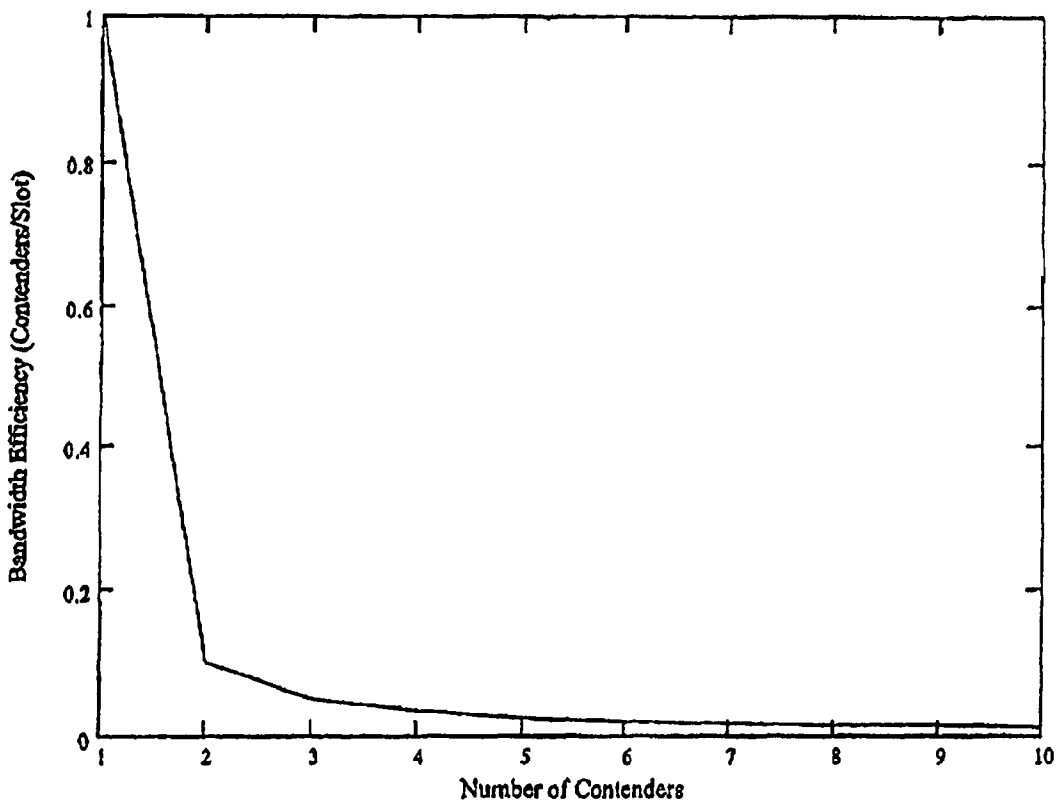

Figure 4 Per Slot Probability of Success Vs Number of Slots
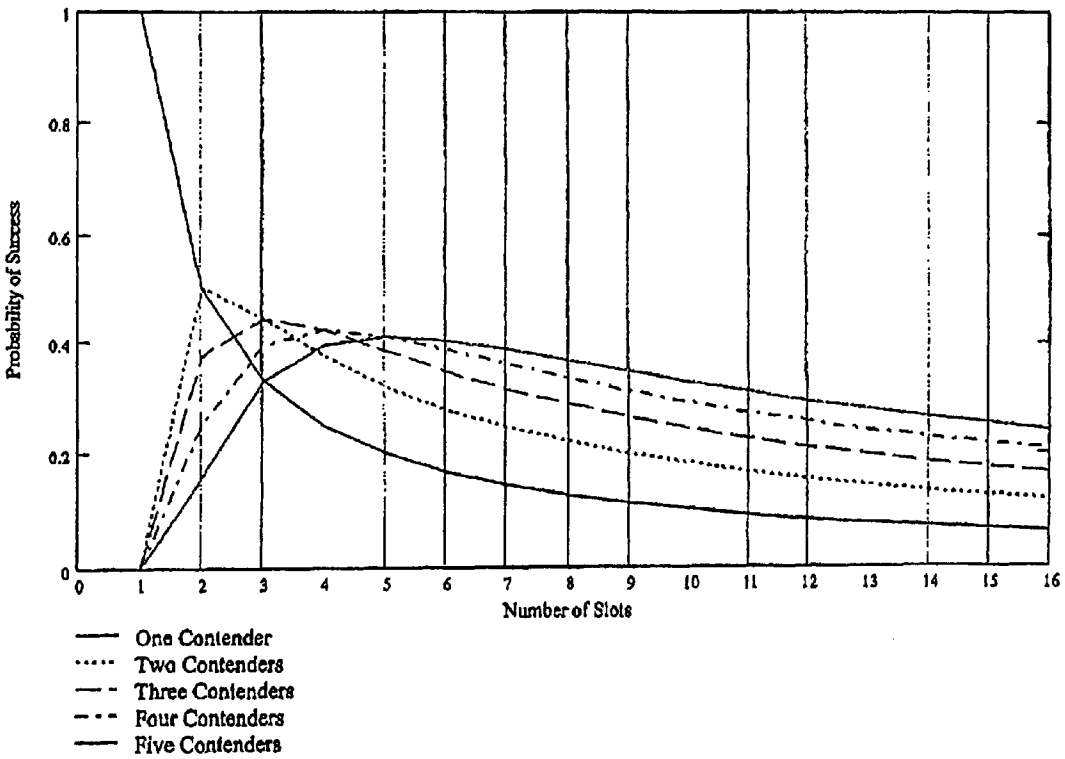

Figure 5 Probability of Given number of Successes with 4 Slots and Given Number of Contenders

| | Contenders | | | | | | |
|---|---|---|---|---|---|---|---|
| Successes | 1 | 2 | 3 | 4 | 5 | 6 | 7 |
| 0 | 0 | .25 | 0.0625 | 0.1563 | 0.1211 | 0.1621 | 0.1951 |
| 1 | 1 | 0 | 0.5625 | 0.1875 | 0.4102 | 0.3691 | 0.4153 |
| 2 | 0 | .75 | 0 | 0.5625 | 0.2344 | 0.3516 | 0.3384 |
| 3 | 0 | 0 | 0.3750 | 0 | 0.2344 | 0.1172 | 0.0513 |
| 4 | 0 | 0 | 0 | 0.0938 | 0 | 0 | 0 |
| 5 | 0 | 0 | 0 | 0 | 0 | 0 | 0 |
| 6 | 0 | 0 | 0 | 0 | 0 | 0 | 0 |
| 7 | 0 | 0 | 0 | 0 | 0 | 0 | 0 |

Figure 6 Per CCI Efficiency for Given Number of Slots and Contenders (No Overhead)

| | Slots | | | | | | | | | | | | | | | |
|---|---|---|---|---|---|---|---|---|---|---|---|---|---|---|---|---|
| cont-enders | 1 | 2 | 3 | 4 | 5 | 6 | 7 | 8 | 9 | 10 | 11 | 12 | 13 | 14 | 15 | 16 |
| 1 | 1 | 0.5 | 0.3333 | 0.25 | 0.2 | 0.1667 | 0.1429 | 0.125 | 0.1111 | 0.1 | 0.0909 | 0.0833 | 0.0769 | 0.0714 | 0.0667 | 0.0625 |
| 2 | 0 | 0.5 | 0.4444 | 0.375 | 0.32 | 0.2778 | 0.2449 | 0.2188 | 0.1975 | 0.18 | 0.1653 | 0.1528 | 0.142 | 0.1327 | 0.1244 | 0.1172 |
| 3 | 0 | 0.375 | 0.4444 | 0.4219 | 0.384 | 0.3472 | 0.3149 | 0.2871 | 0.2634 | 0.243 | 0.2254 | 0.2101 | 0.1966 | 0.1848 | 0.1742 | 0.1648 |
| 4 | 0 | 0.25 | 0.3951 | 0.4219 | 0.4096 | 0.3858 | 0.3598 | 0.335 | 0.3121 | 0.2916 | 0.2732 | 0.2568 | 0.242 | 0.2288 | 0.2168 | 0.206 |
| 5 | 0 | 0.1563 | 0.3292 | 0.3955 | 0.4096 | 0.4019 | 0.3856 | 0.3664 | 0.3488 | 0.3281 | 0.3105 | 0.2942 | 0.2792 | 0.2655 | 0.2529 | 0.2414 |
| 6 | 0 | 0.0938 | 0.2634 | 0.356 | 0.3932 | 0.4019 | 0.3866 | 0.3847 | 0.37 | 0.3543 | 0.3387 | 0.3236 | 0.3093 | 0.2959 | 0.2833 | 0.2716 |
| 7 | 0 | 0.0547 | 0.2046 | 0.3115 | 0.367 | 0.3907 | 0.3866 | 0.3927 | 0.3837 | 0.372 | 0.3592 | 0.3461 | 0.3331 | 0.3205 | 0.3085 | 0.297 |
| 8 | 0 | 0.0313 | 0.1561 | 0.267 | 0.3355 | 0.3721 | 0.3885 | 0.3927 | 0.3897 | 0.3826 | 0.3732 | 0.3626 | 0.3514 | 0.3401 | 0.329 | 0.3183 |
| 9 | 0 | 0.0176 | 0.1171 | 0.2253 | 0.302 | 0.3469 | 0.3746 | 0.3866 | 0.3897 | 0.3874 | 0.3817 | 0.3739 | 0.3649 | 0.3553 | 0.3455 | 0.3357 |
| 10 | 0 | 0.0098 | 0.0867 | 0.1877 | 0.2684 | 0.323 | 0.3568 | 0.3758 | 0.3849 | 0.3874 | 0.3855 | 0.3808 | 0.3743 | 0.3666 | 0.3583 | 0.3498 |
| 11 | 0 | 0.0054 | 0.0636 | 0.1549 | 0.2362 | 0.2961 | 0.3364 | 0.3617 | 0.3764 | 0.3835 | 0.3855 | 0.384 | 0.38 | 0.3745 | 0.3678 | 0.3606 |
| 12 | 0 | 0.0029 | 0.0462 | 0.1267 | 0.2062 | 0.2692 | 0.3145 | 0.3453 | 0.365 | 0.3768 | 0.3824 | 0.384 | 0.3827 | 0.3793 | 0.3745 | 0.3688 |
| 13 | 0 | 0.0016 | 0.0334 | 0.1029 | 0.1787 | 0.243 | 0.2921 | 0.3273 | 0.3515 | 0.3672 | 0.3768 | 0.3813 | 0.3827 | 0.3816 | 0.3787 | 0.3745 |
| 14 | 0 | 0.0009 | 0.024 | 0.0832 | 0.1539 | 0.2181 | 0.2696 | 0.3084 | 0.3364 | 0.3559 | 0.3687 | 0.3764 | 0.3804 | 0.3816 | 0.3806 | 0.3781 |
| 15 | 0 | 0.0005 | 0.0171 | 0.0668 | 0.1319 | 0.1947 | 0.2476 | 0.2891 | 0.3204 | 0.3432 | 0.3591 | 0.3697 | 0.3763 | 0.3796 | 0.3806 | 0.3798 |
| 16 | 0 | 0.0002 | 0.0122 | 0.0535 | 0.1126 | 0.1731 | 0.2264 | 0.2699 | 0.3038 | 0.3294 | 0.3482 | 0.3615 | 0.3705 | 0.376 | 0.3789 | 0.3798 |

Figure 7 Per CCI Efficiency for Given Number of Slots and Contenders (One Slot Overhead)

| | Slots | | | | | | | | | | | | | | | |
|---|---|---|---|---|---|---|---|---|---|---|---|---|---|---|---|---|
| cont-enders | 1 | 2 | 3 | 4 | 5 | 6 | 7 | 8 | 9 | 10 | 11 | 12 | 13 | 14 | 15 | 16 |
| 1 | 0.5 | 0.3333 | 0.25 | 0.2 | 0.1667 | 0.1429 | 0.125 | 0.1111 | 0.1 | 0.0909 | 0.0833 | 0.0769 | 0.0714 | 0.0667 | 0.0625 | 0.0588 |
| 2 | 0 | 0.3333 | 0.3333 | 0.3 | 0.2667 | 0.2381 | 0.2143 | 0.1944 | 0.1778 | 0.1636 | 0.1515 | 0.141 | 0.1319 | 0.1238 | 0.1167 | 0.1103 |
| 3 | 0 | 0.25 | 0.3333 | 0.3375 | 0.32 | 0.2976 | 0.2755 | 0.2552 | 0.237 | 0.2209 | 0.2066 | 0.1939 | 0.1826 | 0.1724 | 0.1633 | 0.1551 |
| 4 | 0 | 0.1667 | 0.2963 | 0.3375 | 0.3413 | 0.3307 | 0.3149 | 0.2977 | 0.2809 | 0.2651 | 0.2504 | 0.237 | 0.2247 | 0.2135 | 0.2033 | 0.1939 |
| 5 | 0 | 0.1042 | 0.2469 | 0.3164 | 0.3413 | 0.3445 | 0.3374 | 0.3257 | 0.3121 | 0.2982 | 0.2846 | 0.2716 | 0.2593 | 0.2478 | 0.2371 | 0.2272 |
| 6 | 0 | 0.0625 | 0.1975 | 0.2848 | 0.3277 | 0.3445 | 0.347 | 0.3419 | 0.333 | 0.3221 | 0.3105 | 0.2987 | 0.2872 | 0.2761 | 0.2656 | 0.2556 |
| 7 | 0 | 0.0365 | 0.1536 | 0.2492 | 0.3058 | 0.3349 | 0.347 | 0.3491 | 0.3453 | 0.3382 | 0.3293 | 0.3195 | 0.3093 | 0.2992 | 0.2892 | 0.2796 |
| 8 | 0 | 0.0208 | 0.1171 | 0.2136 | 0.2796 | 0.319 | 0.3399 | 0.3491 | 0.3508 | 0.3479 | 0.3421 | 0.3347 | 0.3263 | 0.3175 | 0.3085 | 0.2995 |
| 9 | 0 | 0.0117 | 0.0878 | 0.1802 | 0.2517 | 0.299 | 0.3278 | 0.3436 | 0.3508 | 0.3522 | 0.3499 | 0.3451 | 0.3389 | 0.3316 | 0.3239 | 0.3159 |
| 10 | 0 | 0.0065 | 0.065 | 0.1502 | 0.2237 | 0.2769 | 0.3122 | 0.3341 | 0.3464 | 0.3522 | 0.3534 | 0.3515 | 0.3475 | 0.3422 | 0.3359 | 0.3291 |
| 11 | 0 | 0.0036 | 0.0477 | 0.1239 | 0.1969 | 0.2536 | 0.2943 | 0.3215 | 0.3387 | 0.3487 | 0.3534 | 0.3545 | 0.3529 | 0.3495 | 0.3449 | 0.3394 |
| 12 | 0 | 0.002 | 0.0347 | 0.1014 | 0.1718 | 0.2307 | 0.2752 | 0.3069 | 0.3285 | 0.3423 | 0.3505 | 0.3545 | 0.3554 | 0.354 | 0.3511 | 0.3471 |
| 13 | 0 | 0.0011 | 0.025 | 0.0824 | 0.1489 | 0.2083 | 0.2558 | 0.2909 | 0.3163 | 0.3338 | 0.3452 | 0.352 | 0.3554 | 0.3562 | 0.355 | 0.3525 |
| 14 | 0 | 0.0006 | 0.018 | 0.0665 | 0.1283 | 0.1869 | 0.2359 | 0.2742 | 0.3028 | 0.3236 | 0.3379 | 0.3475 | 0.3533 | 0.3562 | 0.3569 | 0.3559 |
| 15 | 0 | 0.0003 | 0.0128 | 0.0535 | 0.11 | 0.1669 | 0.2166 | 0.257 | 0.2884 | 0.312 | 0.3292 | 0.3413 | 0.3494 | 0.3543 | 0.3569 | 0.3575 |
| 16 | 0 | 0.0002 | 0.0091 | 0.0428 | 0.0936 | 0.1484 | 0.1981 | 0.2399 | 0.2734 | 0.2995 | 0.3192 | 0.3337 | 0.344 | 0.351 | 0.3553 | 0.3575 |

Figure 8 Per CCI Efficiency for Given Number of Slots and Contenders (Two Slot Overhead)

| | Slots | | | | | | | | | | | | | | | |
|---|---|---|---|---|---|---|---|---|---|---|---|---|---|---|---|---|
| cont-enders | 1 | 2 | 3 | 4 | 5 | 6 | 7 | 8 | 9 | 10 | 11 | 12 | 13 | 14 | 15 | 16 |
| 1 | 0.3333 | 0.25 | 0.2 | 0.1667 | 0.1429 | 0.125 | 0.1111 | 0.1 | 0.0909 | 0.0833 | 0.0769 | 0.0714 | 0.0667 | 0.0625 | 0.0588 | 0.0556 |
| 2 | 0 | 0.25 | 0.2667 | 0.25 | 0.2286 | 0.2083 | 0.1905 | 0.175 | 0.1616 | 0.15 | 0.1399 | 0.131 | 0.1231 | 0.1161 | 0.1098 | 0.1042 |
| 3 | 0 | 0.1875 | 0.2667 | 0.2813 | 0.2743 | 0.2604 | 0.2449 | 0.2297 | 0.2155 | 0.2025 | 0.1907 | 0.1801 | 0.1704 | 0.1617 | 0.1537 | 0.1465 |
| 4 | 0 | 0.125 | 0.237 | 0.2813 | 0.2926 | 0.2894 | 0.2799 | 0.268 | 0.2554 | 0.243 | 0.2312 | 0.2201 | 0.2097 | 0.2002 | 0.1913 | 0.1831 |
| 5 | 0 | 0.0781 | 0.1975 | 0.2637 | 0.2926 | 0.3014 | 0.2999 | 0.2931 | 0.2836 | 0.2734 | 0.2627 | 0.2522 | 0.242 | 0.2323 | 0.2232 | 0.2146 |
| 6 | 0 | 0.0469 | 0.158 | 0.2373 | 0.2809 | 0.3014 | 0.3084 | 0.3077 | 0.3027 | 0.2952 | 0.2866 | 0.2774 | 0.2681 | 0.2589 | 0.25 | 0.2414 |
| 7 | 0 | 0.0273 | 0.1229 | 0.2076 | 0.2621 | 0.293 | 0.3084 | 0.3142 | 0.3139 | 0.31 | 0.3039 | 0.2966 | 0.2887 | 0.2805 | 0.2722 | 0.264 |
| 8 | 0 | 0.0156 | 0.0936 | 0.178 | 0.2397 | 0.2781 | 0.3021 | 0.3142 | 0.3189 | 0.3189 | 0.3158 | 0.3108 | 0.3046 | 0.2976 | 0.2903 | 0.2829 |
| 9 | 0 | 0.0088 | 0.0702 | 0.1502 | 0.2157 | 0.2616 | 0.2914 | 0.3092 | 0.3189 | 0.3229 | 0.323 | 0.3205 | 0.3163 | 0.3109 | 0.3049 | 0.2984 |
| 10 | 0 | 0.0049 | 0.052 | 0.1251 | 0.1917 | 0.2423 | 0.2775 | 0.3007 | 0.3149 | 0.3229 | 0.3262 | 0.3264 | 0.3244 | 0.3208 | 0.3161 | 0.3108 |
| 11 | 0 | 0.0027 | 0.0382 | 0.1032 | 0.1687 | 0.2221 | 0.2616 | 0.2894 | 0.3079 | 0.3196 | 0.3262 | 0.3291 | 0.3294 | 0.3277 | 0.3246 | 0.3206 |
| 12 | 0 | 0.0015 | 0.0277 | 0.0846 | 0.1473 | 0.2019 | 0.2446 | 0.2762 | 0.2986 | 0.3136 | 0.3235 | 0.3291 | 0.3317 | 0.3319 | 0.3305 | 0.3278 |
| 13 | 0 | 0.0008 | 0.02 | 0.0686 | 0.1276 | 0.1823 | 0.2272 | 0.2618 | 0.2876 | 0.306 | 0.3186 | 0.3269 | 0.3317 | 0.3339 | 0.3341 | 0.3329 |
| 14 | 0 | 0.0004 | 0.0144 | 0.0554 | 0.11 | 0.1636 | 0.2097 | 0.2467 | 0.2753 | 0.2966 | 0.3119 | 0.3227 | 0.3297 | 0.3339 | 0.3359 | 0.3361 |
| 15 | 0 | 0.0002 | 0.0103 | 0.0445 | 0.0942 | 0.146 | 0.1926 | 0.2313 | 0.2622 | 0.286 | 0.3038 | 0.3169 | 0.3261 | 0.3322 | 0.3359 | 0.3376 |
| 16 | 0 | 0.0001 | 0.0073 | 0.0356 | 0.0804 | 0.1298 | 0.1761 | 0.2159 | 0.2486 | 0.2745 | 0.2946 | 0.3099 | 0.3211 | 0.329 | 0.3344 | 0.3376 |

Figure 9 Overall Multi-CCI Efficiency for Given Number of Contenders with Optimum Slot Allocation

| | Overall Multi-CCI Efficiency | | |
|---|---|---|---|
| Contenders | No Overhead | One Slot Overhead | Two Slot Overhead |
| 1 | 1.0000 | 1.0000 | 1.0000 |
| 2 | 0.5000 | 0.3333 | 0.2667 |
| 3 | 0.4706 | 0.3358 | 0.2752 |
| 4 | 0.4533 | 0.3381 | 0.2819 |
| 5 | 0.4414 | 0.3401 | 0.2874 |
| 6 | 0.4327 | 0.3418 | 0.2921 |
| 7 | 0.4261 | 0.3432 | 0.2962 |
| 8 | 0.4208 | 0.3445 | 0.2997 |
| 9 | 0.4165 | 0.3457 | 0.3033 |
| 10 | 0.4129 | 0.3467 | 0.3061 |

Figure 10 Method for Estimating Number of Contenders
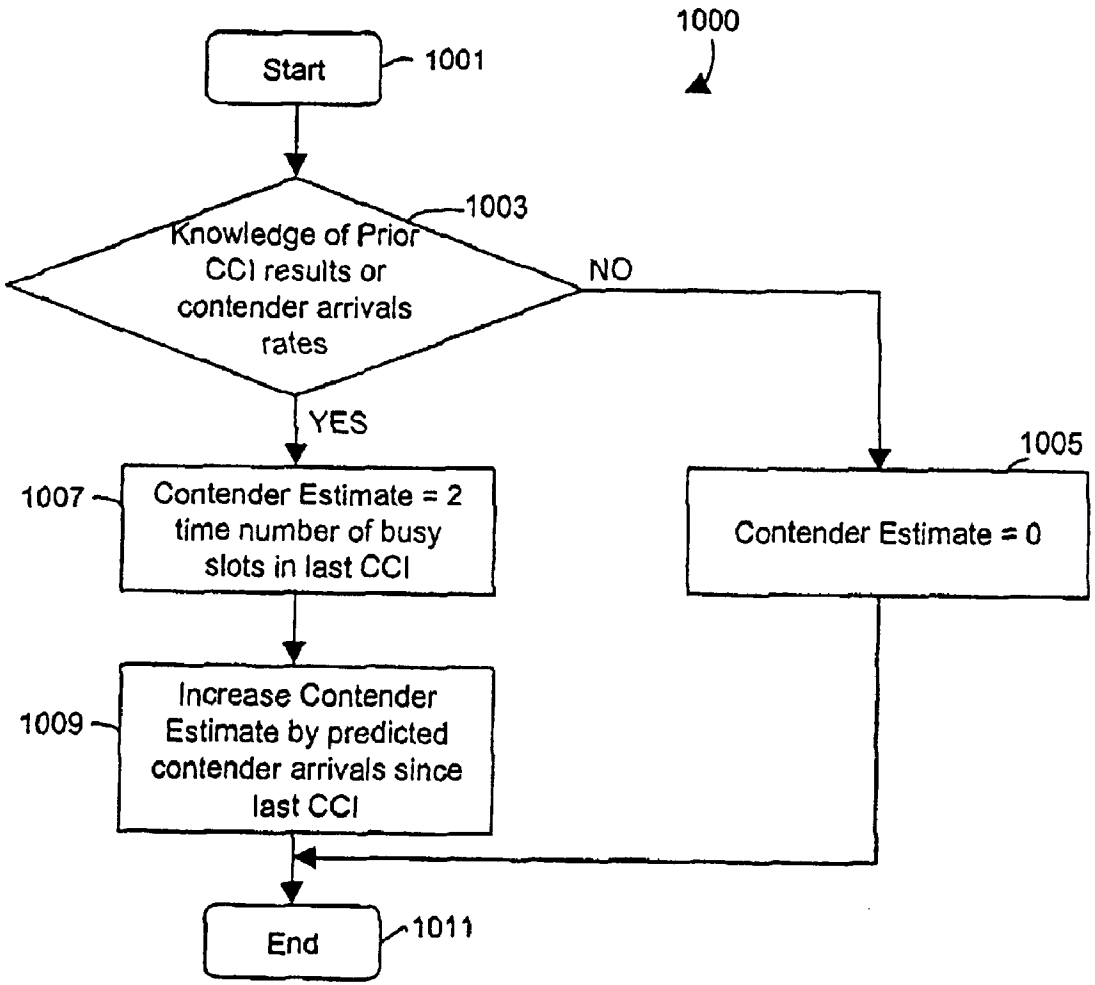

Figure 11 Method for Optimally Serving Contenders in CC/RR Protocol
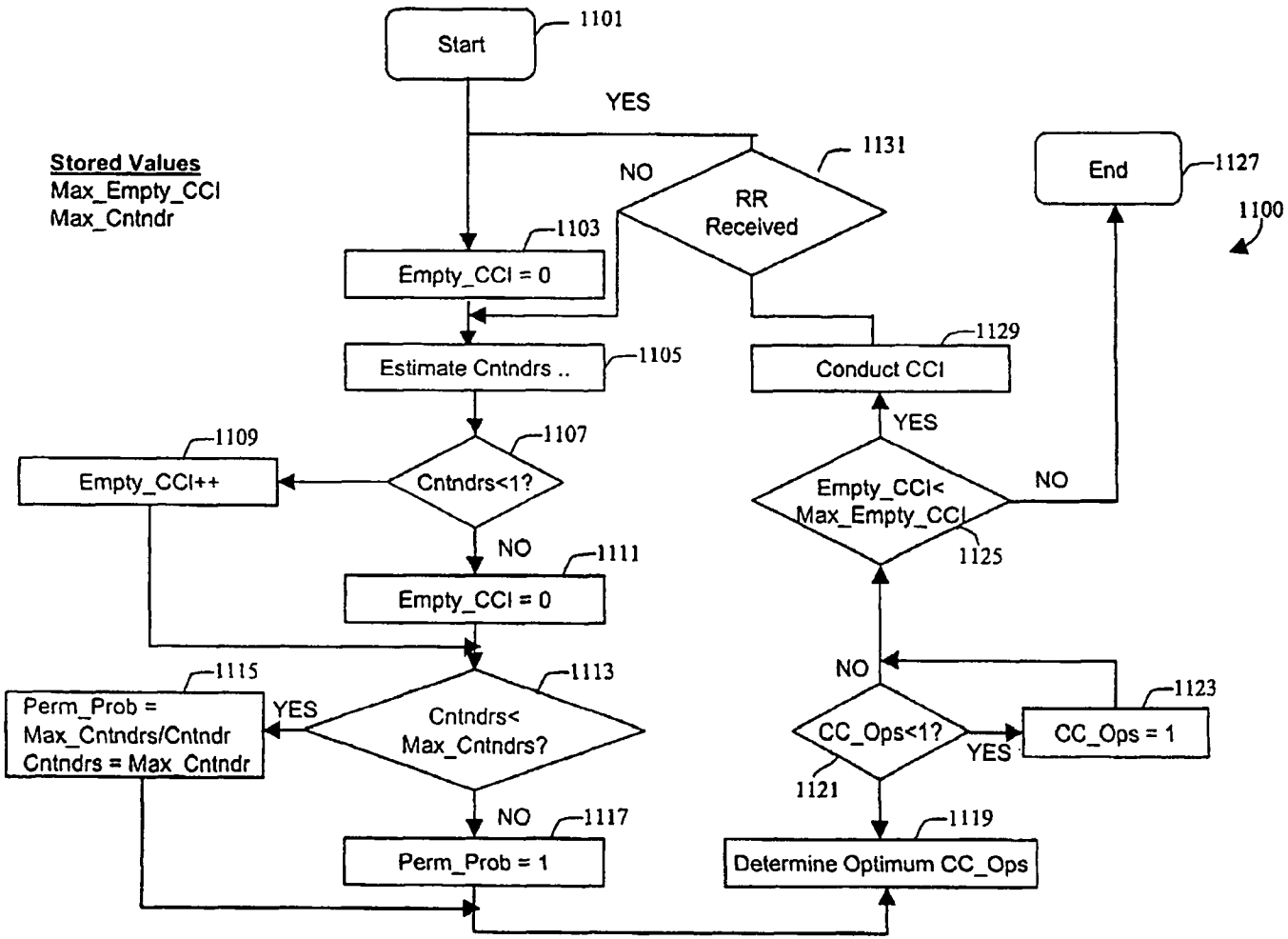

METHOD AND SYSTEM FOR OPTIMALLY SERVING STATIONS ON WIRELESS LANS USING A CONTROLLED CONTENTION/RESOURCE RESERVATION PROTOCOL OF THE IEEE 802.11E STANDARD

Matter enclosed in heavy brackets [ ] appears in the original patent but forms no part of this reissue specification; matter printed in italics indicates the additions made by reissue.

This application claims the benefit of the filing date of Provisional Application Serial No. 60/335,504, filed Oct. 31, 2001, entitled "Methods For Allocating Controlled Opportunities In A Mediaplex Controlled Interval", assigned to the same assignee as that of the present invention and fully incorporated herein by reference.

BACKGROUND OF THE INVENTION

1. Field of the Invention

This invention relates to wireless communication methods and system. More particularly, the invention relates to a method and system for optimally serving stations on Wireless LANs using a Controlled Contention/Resource Reservation protocol of the IEEE 802.11e standard.

2. Description of the Prior Art

IEEE 802.11 is a standards body developing Wireless Local Area Network (WLAN) Standards [802.11, 802.11a, 802.11b]. Recently, that body has started development of a supplement that would specify the support of Quality of Service (QoS) within 802.11 WLANs. This work is being carried out by the 802.11e Task Group, and the most current draft of the QoS extensions being developed (as of the writing of this application) can be found in [802.11e]. A set of protocols has been proposed for use in 802.11(e) based on centralized control of the wireless media. In this protocol set, during specified periods of time called Contention Free Periods (CFPs) and Contention Free Bursts (CFBs), STATIONs (STA) may only use the wireless medium when granted permission from the Hybrid Coordinator (HC). The HC is responsible for allocating bandwidth on the wireless medium and ensuring that QoS needs are met. The HC generally grants the use of the medium to a STA by polling it. This transfers control of the medium to that STA for a limited period of time. Control of the medium must then revert to the HC.

A problem which is addressed within the 802.11e draft is how to make the HC aware of changing bandwidth needs for the STA it serves. A protocol included in 802.11e for doing this was first proposed in [00/33] to the 802.11 community. The protocol is termed the Contention Control/Resource Reservation (CC/RR) protocol. In this protocol, the HC grants the medium for use by Resource Reservation (RR) frames by transmitting a Contention Control (CC) frame. Only RR frames may be transmitted during the time period specified by the CC frame. This time period is called the Controlled Contention Interval (CCI). The RR frames detail the bandwidth needs of the STA transmitting them. Several parameters for the CCI are specified by the CC frame. These include a Permission Probability (PP), the number of Controlled Contention Opportunities (CC_OPs), and a set of flags indicating which Traffic Categories (TC or Priorities) may compete for the medium with RR frames during an upcoming CCI. The protocol states that when a STA receives a CC message and wishes to send a RR for an appropriate TC, it will chose a random number between 0 and 1. If the random number is less than or equal to the PP value, the STAs is permitted to transmit the RR. It then randomly selects a CC_OP in which to transmit (Note: the current draft of 802.11.e has eliminated the PP value, so STAs transmit a RR during a CCI whenever a permitted TC has one to transmit). Since other STAs may be transmitting RR frames, there is a possibility that multiple RRs will be transmitted in a CC_Op, and none will be received correctly (though it is possible due to RF capture effects one will be correctly received despite the contention). Such a CC_OP would be considered collided or "busy". If only one RR is transmitted in the CC_Op, it most likely will be received correctly (although, due to interference or noise on the wireless medium or propagation issues it is possible, it will be lost anyway). And finally, some CC_OPs will not contain any RR, and in some sense those "empty" CC_OPs waste bandwidth on the medium.

While [00/331 and 802.11e detail the overall protocol, required frame formats, and how the transmitted CC parameters are used by the STA, there is no detail on how the key parameters are determined and set by the HC. What is needed in the art are methods which advantageously set the parameters for the CC/RR protocol so as to optimize performance for efficient use of the medium.

SUMMARY OF THE INVENTION

Wireless LANs operating under the IEEE 802.11(e) protocol include an Access Point serving a plurality of Mobile STAs (MS). The protocols provide centralized control of the wireless media during specified periods of time called Contention Free Periods (CFPs) and Contention Free Bursts (CFBs). A Hybrid Coordinator (HC), typically co-located with the Access Point, allocates bandwidth among the MS contenders. The HC regularly transmits Contention Control (CC) frames, which initiate Controlled Contention Intervals (CCI) having a selected number of slotted intervals. The HC receives Resource Reservations (RR) detailing bandwidth needs from the MS contenders during a specified time interval of the CC called the Controlled Contention Interval (CCI). Each CCI has several parameters including a number of slots or Controlled Contention Opportunities (CC_OP), an optional Permission Probability (PP) and a set of flags indicating which Traffic Categories (TC) may compete for the CC_OPs. When an MS contender receives a CC, an RR is transmitted which specifies the bandwidth needs of the MS contender and is assigned a CC_OP slot if it succeeds in drawing a random number less than the PP. Since other MS contenders may be transmitting RR frames, there is the possibility of collision and none will be received in the CCI, which wastes bandwidth, or some CC_OP or slots may not contain a RR, which also wastes bandwidth. An algorithm sets the CCI parameters to optimize efficient use of the medium and reduce access delays for RR frames contending for the wireless medium. Efficient use is defined in terms of network service time or bandwidth utilization. The algorithm assumes: First, each CCI contains at least one slot or CC_OP; second, there is no limit or at least a large limit on the number of CC_OPs in a CCI; third, perfect knowledge or an estimate of the number of contenders is available. The algorithm stores the value (a) Max_Empty_CCI defined as a selected number of Empty_CCIs to end the cycle for serving contenders and (b) Max_Contendr defined as the maximum number of contenders the HC desires to serve in a single CCI. In step 1, a counter Empty_CC is set to 0. Step 2 estimates the number of contender based on prior CCI results and traffic models. Step 3 conducts a test to determine if the number of contenders is less than 1. A "no" condition resets the Empty_CCI counter to 0. A "yes" increments the Empty_CCI counter. Step 3 transfers to Step 4 which starts a test: Cntndrs>than the stored Max_Cntndrs. A "yes" calculates a Permission Probability Max_Cntndrs/Contender in step 5 and sets Cntndrs=Max_Cntndrs. A "no" condition indicates a Permission Probability of 1. Both Steps 4 and 5 transfer to Step 6 which Determines Optimum CC_OPs and approximates the overhead as 1 or 2 slots. Step 6 transfers to Step 7 which performs a test" CC_OPs<1. A "yes" condition sets CC_OPs to +1 and transfers to Step 8. A "no" condition also transfers to Step 8 which conducts a test: Empty_CCI<Max_Empty_CCI. If "no" the process ends, and if "yes" the CCI is conducted and the process iterates returning to Step 2.

One aspect of the invention sets the number of slots or CC_OPs equal to the number of contending STAs where the efficiency is calculated on a slot basis or on an overall CCI basis, not taking into account overhead or the number of slots required to report results to the STA. The efficiency is lowered when taking into account overhead where the overhead is assumed to be one or two slots.

Another aspect uses multiple concatenated CCIs, which maximizes efficiency where every CCI uses the optimum number of slots for the number of contenders in existence.

Another aspect estimates the number of MS contenders based on prior CCI results or contender arrival rates where the number of contenders may be estimated as two times the number of busy slots in the last CCI which is increased by the predicted contender arrivals since the last CCI.

Another aspect calculates a permission probability to limit the expected number of contender in a CCI given the number of contenders and maximum allowed number of slots and limits the number of contenders based on the calculated probability.

DESCRIPTION OF THE DRAWINGS

The invention will be further understood from the following detailed description of a preferred embodiment taken in conjunction with an appended drawing, in which:

FIG. 2A is a representation of the CC/RR protocol implemented in the Wireless LAN of FIG. 1;

FIG. 3 is a graph of a single CCI servicing 95% of MS contenders;

FIG. 4 is a graph of per Slot Probability of Success versus the Number of Slots;

FIG. 5 is a table of the Probability of a Given number of Successes with 4 Slots and a Given Number of Contenders;

FIG. 6 is a table of CCI efficiency for a Given Number of Slots and Contenders without Overhead;

FIG. 7 is a table of CCI efficiency for a Given Number of Slots and Contenders with One Slot Overhead;

FIG. 8 is a table of CCI efficiency for a Given Number of Slots and Contenders with two Slot Overhead;

FIG. 9 is a table of overall multi-CCI efficiency for a Given number of Contenders with optimum Slot Allocation;

FIG. 10 is a flow diagram for estimating the number of Contenders in the Wireless LAN of FIG. 1; and FIG. 11 is a flow diagram for optimally serving contenders in the Wireless LAN of FIG. 1 using the CC/RR protocol of IEEE 802.11 (e).

DESCRIPTION OF PREFERRED EMBODIMENT

Figure 1:
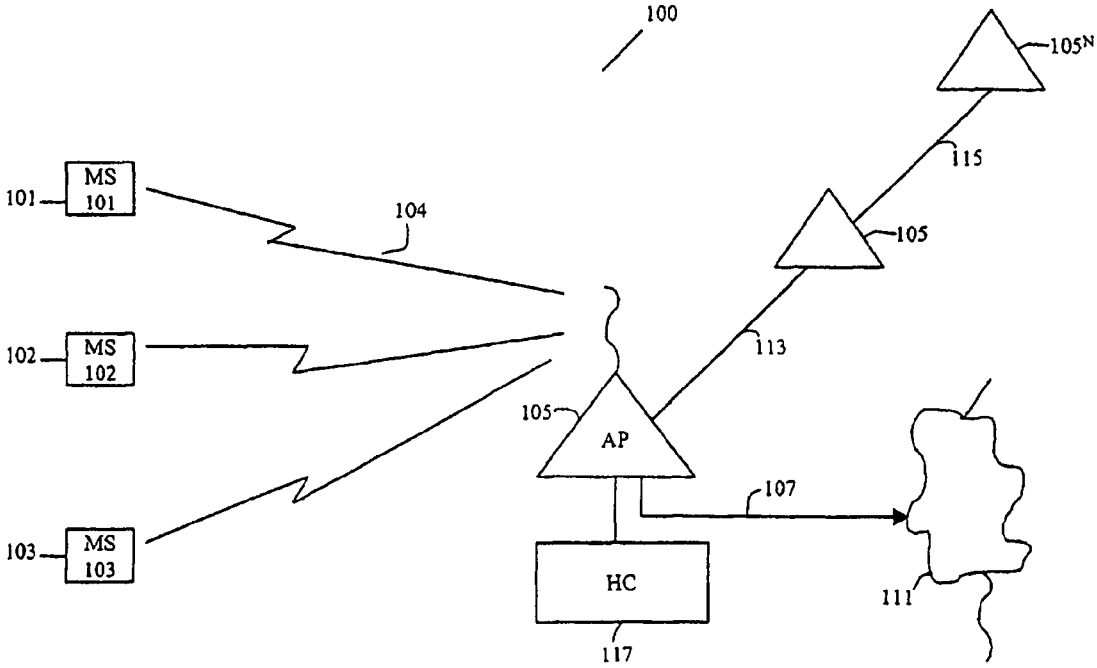
FIG. 1 is a representation of a Wireless LAN using the IEEE 802.11 (e) protocol and incorporating the principles of the present invention.

Before describing the present invention, a brief review of the IEEE 802.11 Wireless LAN Standard is believed appropriate for a better understanding of the invention.

The IEEE 802.11 standard defines over-the-air protocols necessary to support networking in a local area. The standard provides a specification for wireless connectivity of fixed, portable and moving STAs within the local area. The logical architecture of the 802.11 standard comprises a Medium Access Control (MAC) layer interfacing with a Logical Link Controller (LLC) and providing access control functions for shared medium physical layers. The primary service of the 802.11 standard is to deliver Medium Access Control Service Data Units (MSDU) between the LLC in a network interface card at a STA and an access point. Physical layers are defined to operate in the 2.4 GHz ISM frequency band with frequency hopping or Direct Sequence (DS) modulation. Other physical layers are also defined. The MAC layer provides access control functions for shared medium physical layers in support of the logical link control layer.

The medium used by WLANs is often very noisy and unreliable. The MAC implements a frame exchange protocol to allow the source of a frame to determine when the frame has been successfully delivered at the destination. The minimal MAC frame exchange consists of two frames: a frame sent from the source to the destination and an acknowledgement from the destination that the frame was received correctly. Multicast frames are not acknowledged. The MAC recognizes five timing intervals. Two intervals are determined by the physical layer and include a short interframe space (SIFS) and a slot time. Three additional intervals are built from the two basic intervals: a PCF interframe space (PIFS), a distributed interframe space (DIFS) and an extended interframe space (EIFS). The PIFS is equal to the SIFS plus one slot time; the DIFS is equal to the SIFS plus two slot times; the EIFS is much larger than any of the other intervals. If present, a point coordination function (PCF) uses a poll and response protocol to remedy contention for the medium. The point coordinator (PC) located in the access point regularly polls STAs for traffic while delivering traffic to the STAs. The PCF makes use of the PIFS to seize and maintain control of the medium. The PC begins a period of operation called the contention free period (CFP). The CFP alternates with a contention period (CP) where normal distributed control functions operate.

A combination of both physical and virtual carrier sense mechanisms enable the MAC to determine whether the medium is busy or idle. If the medium is not in use for an interval of DIFS, the MAC may begin transmission of a frame if back-off requirements have been satisfied. If a back-off requirement exists, the time when the medium is idle after DIFS is used to satisfy it. If either the physical or virtual carrier sense mechanism indicate the medium is in use during the DIFS interval, the MAC remains idle (defers) and waits for the medium to clear. Periodically, a beacon frame is transmitted by the PC after gaining access to the medium using PIFS timing.

After the PC has control of the medium, traffic is delivered to STAs in its network and STAs deliver traffic, if polled, during the contention-free period. The PC also sends a contention-free poll (CF-POLL) frame to those STAs that have requested contention-free service. A requesting STA may transmit one frame for each CF-POLL received. The STA responds with a null data frame if there is no traffic to send. A frame sent from the STA to the PC may include an acknowledgement of a data frame just received from the PC. The PC may use a minimal spacing of SIFS between frame sequences when the CFP is in progress. When a PC sends a data frame to a STA, a responding frame includes an acknowledgement using a SIFS interval between the data and Acknowledgement frame. When a PC sends a poll frame, minimally a null data frame must be sent in response to the PC, again using the SIFS timing. Acknowledgments and polls may be "piggybacked" on data frames, permitting a wide variety of allowed frame sequences. The PC may transmit its next frame if a response was not initiated before a PIFS interval expires, or may back-off if it so desires.

Further details on the 802.11 standard are described in the text "Wireless LANs—Implementing Inter-Operable Networks by J. Gyer, published by Macmillan Technical Publishing, 1999 (International Standard Book No. 1-57870-081-7) and The IEEE 802.11 Handbook—A Designer's Companion by R. O'Hara and A. Petrick, published by the IEEE, New York, N.Y., 1999 (ISBN 07381-1855-9).

Now turning to the description of the invention, FIG. 1 discloses a WLAN 100 implementing the IEEE 802.11(e) standard (Unpublished) which defines MAC procedures to support LAN applications with Quality of Service (QoS) requirements, including the transport of voice, audio and video over IEEE 802.11 wireless LANs. The IEEE 802.11(e) standard modifies existing and includes new definitions relating to the IEEE 802.11 standard. The description of the preferred embodiment will be based on the 802.11(e) definitions upon which the invention is based. A description of the differences between the 802.11 and 802.11(e) definition is not necessary for an understanding and appreciation of the invention.

The WLAN 100 includes MS 101, 102 and 103 which serve as a Basic Service Set (BSS) and are air-linked 104 to an access point 105 via an Unlicensed National Information Infrastructure (U-NII) band, as in one embodiment, or in other frequency bands consistent with the requirements of 802.11 (e). The access point 105 or a wireless local bridge interfaces the BSS with a wired path 107 linked to a wired network 111 (e.g., PSTN) which in turn may be linked to other networks, e.g., the Internet. The access point 105 may be linked to other access points 105$^a$ . . . 105$^n$ in an Extended Service Set (ESS) via wired paths 113 and 115 (or via a wireless path). The text Wireless LANs Implementing Interoperable Networks, supra at pages 44 and 53, provides further details on access points functioning as wireless local or remote bridges.

A Hybrid Coordinator (HC) 117 co-located with and connected to the access point 105 is responsible for allocating bandwidth on the wireless medium 104. The HC serves as a Point Coordinator (PC) that implements the frame exchange sequences and MSDU handling rules defined by the hybrid coordination function. The HC operates during the contention period and contention-free period and performs bandwidth management including the allocation of transmission opportunities (TXOP) to STAs and the initiation of control contention intervals. In performing the hybrid coordination function, the distributed coordination function (DCF) and the point coordination function (PCF) provide selective handling of MSDUs required for a QoS facility.

The STAs 101, 102 and 103 operate as a fully connected wireless network via the access point which provides distribution services necessary to allow mobile STAs to roam freely within the extended service set (ESS) where the APs communicate among themselves to forward traffic from one BSS to another and to facilitate the movement of mobile STAs from one BSS to another. Each AP includes a distributed service layer that determines if communications received from the BSS are relayed back to a destination in the BSS or forwarded to a BSS associated with another AP or sent to the wired network infrastructure to a destination not in the ESS. Further details on the distribution system are described in the text IEEE 802.11 Handbook —A Designer's Companion, supra, at pages 12-15.

The HC includes a QoS facility, which provides a set of enhanced functions, formats, frame exchange sequences and manage objects to support the selective handling of eight traffic categories or streams per bilateral wireless link. A traffic category is any of the identifiers usable for higher layer entities to distinguish MSDUs to MAC entities that support quality of service within the MAC data service. The handling of MSDUs belonging to different traffic categories may vary based on the relative priority indicated for that MSDU, as well as the values of other parameters that may be provided by an external management entity in a traffic specification for the particular traffic category, link and direction.

Now turning to FIG. 2A, a control contention/resource reservation protocol is described in terms of a superframe 200 which is a contention-free repetition interval in a QoS basic service set (QBSS), consisting of a single CFP Period=1 and at least one beacon interval. The superframe includes a contention-free period 202 and a contention period 204. The contention-free period 202 is a time period during operation of a BSS when a point coordination function (PCF) or hybrid coordination function (HCF) is active and the right to transmit is assigned to STAs by a point coordinator (PC) or hybrid coordinator (HC) allowing frame exchanges to occur without intra-BSS contention for the wireless medium. The contention period is a time period during the operation of the BSS when a distributed coordination function (DCF) or hybrid coordination function (HCF) is active, and the right to transmit is either determined remotely at STAs with pending transfers contending for the Wireless Medium (WM) using a Carrier Sense Multiple Access algorithm with Collision Avoidance (CSMA/CA) or is assigned to an enhanced STA or the hybrid coordinator.

The superframe is initiated from the hybrid coordinator with beacon messages sent by the AP at regular intervals to the BSS. Beacon messages contain the domain ID, the WLAN network ID of the access point, communications quality information and cell search threshold values. The domain ID identifies the access points and mobile STAs that belong to the same WLAN roaming network. A mobile STA listening for beacons will only interpret beacon messages with the same domain ID. Additional details relating to the beacon messages are described in the text Wireless LANs—Implementing Inter-Operable Networks, supra at pages 210-212.

The CFP 202 includes contention control frames (CC) 208 during which period enhanced STAs may request transmission opportunities from the HC without the highly variable delays of DCF based contention and a busy BSS that supports LAN applications with quality requirements. Each instance of controlled contention occurs solely among a set of STAs that need to send reservation requests which meet criteria defined by the HC. Controlled contention takes place during a controlled contention interval (CCI), the starting time and duration of which are determined by the HC. Correct reception of RR frames received during a CCI is acknowledged in the next transmitted CC frame. Each controlled contention interval (CCI) 210 begins a PIFS interval after the end of a CC controlled frame. Only the HC is permitted to transmit CC controlled frames. CC frames may be transmitted during both the CP and CFP subject to the restriction that the entirety of the CC frame and the CCI, which follows the CC frame, shall fit within a single CP or a CFP. When initiating CC, the HC generates and transmits a control frame of subtype CC that provides the length of the CCI in terms of the number of CCI opportunities or slots and specifies the duration of the slot and the CCI. The duration of a slot is a number of microseconds to send a reservation request frame at the same data rate, coding and preamble options as used to send the CC frame plus one SIFS.

Figure 2B:
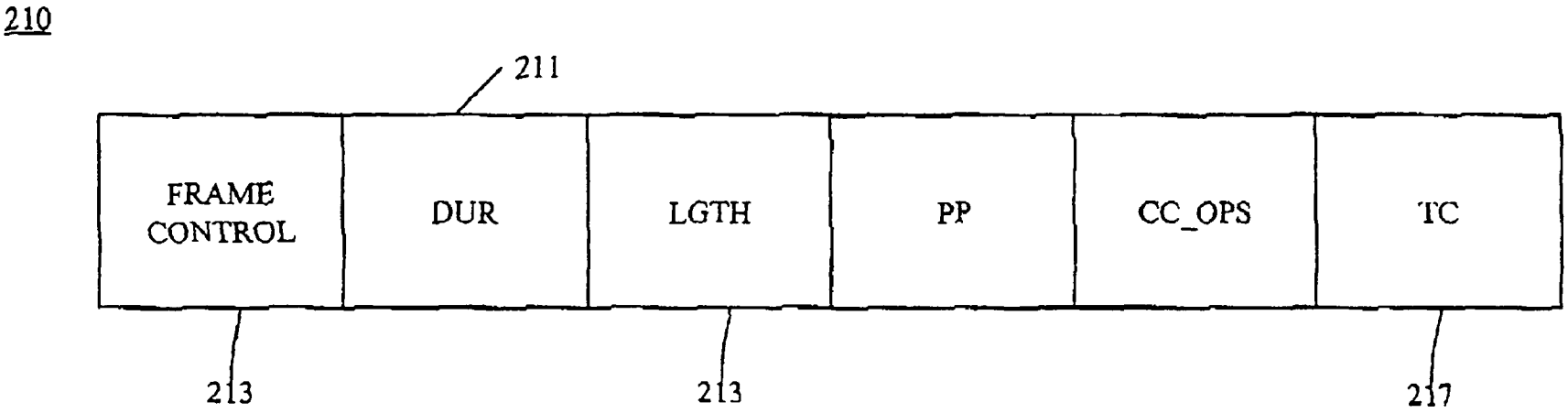
FIG. 2B is a representation of a Controlled Contention Interval in the CC/RR protocol of FIG. 2A.

FIG. 2B shows the CC frame 210 in further detail. The frame starts with a frame control field 219. The duration/ID field 211 is two octets that specify the duration of the CCI+2 PIFS in microseconds. A CCI length field 213 is a single octet that specifies the number of CC_OPs in the CCI that follows the CC frame. A CCI length value of 0 is used in the CC frames used exclusively to provide feedback on previously received Reservation request (RR) frames and does not initiate a new CCI. A Permission Probability (PP) field 214 may be included to level the playing field among the competing STAs as will be described hereinafter. A CC_OP duration field 215 is a single octet that specifies the duration of each CC_OP. The CC_OP duration is the number of microseconds to send a reservation request frame at the same data rate, coding and preamble option as used to send the CC frame plus one SIFS. A traffic category field 217 indicates which traffic categories may compete for the medium with RR frames during the upcoming CCI.

Figure 2C:
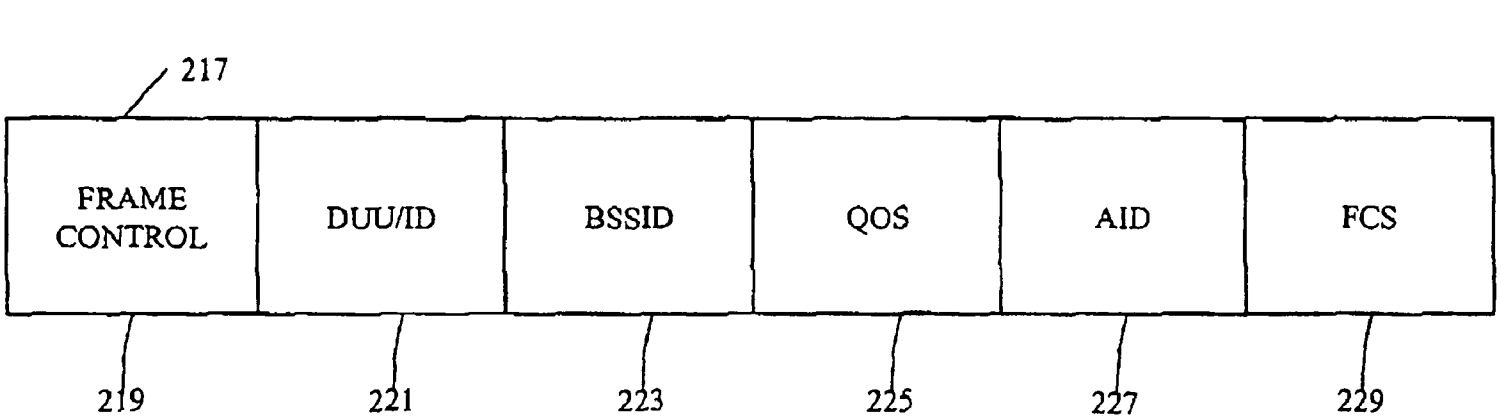
FIG. 2C is a representation of a reservation request frame in the CC/RR protocol of FIG. 2A.

FIG. 2C discloses a Reservation Request (RR) frame 216 that includes a frame control field 219; a duration/ID field 221 which is set to 0; a BSSID field 223 for the basic service set; and a quality of service field 225 which contains a Traffic ID for which a request is being made along with the requested transmission duration or queue size. An Association Identifier (AID) 227 contains the association identification of the STA sending the request and a frame check sequence field 229.

Returning to FIG. 2A, each instance of controlled contention occurs during a controlled contention interval (CCI) which begins a PIFS interval after the end of a CC control frame. Only the HC is permitted to transmit CC control frames. CC frames may be transmitted during both the CP and the CFP, subject to the restriction that the entirety of the CC frame and the CCI, which follows the CC frame, shall fit within a single CP or CFP.

When initiating controlled contention, the HC shall generate and transmit a control frame of subtype CC that includes a priority mask, the duration of each CC_OP and the number of CC_OPs within the CCI. The priority mask allows the HC to specify a subset of the priority values for which requests are permitted within the particular CCI to reduce the likelihood of collisions under high load conditions.

Upon receipt of a control frame of subtype CC, the STA(s) performs the CCI response procedure, as follows:

a) If the CCI length value in the received CC frame is 0 or if the STA has no pending request, the STA makes no further transmission until after the CCI, determined by an elapsed time, following the end of the CC frame equal to the number of microseconds indicated in the duration/ID field of the CC frame.

b) If the priority of the traffic belonging to the traffic category (TC) for which the request is pending corresponds to a bit position which is set to 0 in the priority mask field of the CC frame, no request is transmitted for that TC during the current CCI. Each STA may transmit no more than one request during each CCI. However, a STA with multiple TCs in need of new or modified transmission opportunities is permitted to select the TC for which a request is sent based on the value and the priority mask field of the CC frame. At the end of this step, each potential contending STA proceeds to step (c) below having selected exactly one request to be transmitted during the current CCI or all other STAs make no further transmission until after the CCI is completed.

c) The STA transmits a control frame of subtype RR with values in the quality of service controlled field that identifies the traffic category and either transmission duration or the transmission category queue size. The start of the RR transmission follows the end of the CC frame by a number of microseconds. The RR shall be transmitted at the same data rate as the CC frame that initiated the CCI. After transmitting the RR frame or determining the RR cannot be transmitted because a network allocation vector is set, the STA makes no further transmission until after the CCI is completed.

Now turning to addressing proper setting of the CC parameters, one must first consider what information is available upon which to base decisions. One piece of information is an estimate of the number of contending STAs (contenders) trying to deliver RR frames. It is also assumed that each STA would attempt to place no more than one RR per CCI. It should be obvious to one skilled in the art that if a constant probability for successfully placing a RR during a single CCI is desired, then the larger the number of contenders, the greater the number of CC_OPs (time slots or just slots) required. The cost of placing a failed RR is delay and a degree of wasted bandwidth (collisions or collided slots). However, the cost of over provisioning the number of slots is wasted bandwidth as well (empty slots). Note that throughout this application the terms RR and contenders, as well as the terms CC_OPs and slots, will be used interchangeably.

Clearly there is a tradeoff between delay and wasted bandwidth, as well as how the bandwidth is wasted. Depending on the system's configuration, the delay cost of a failed RR can be high or low. If the HC is configured to send back-to-back CC frames (initiating back-to-back CCI) until it believes all desired RR frames have been received, then the delay impact of a failed RR may be quite low. If on the other hand there is a substantial gap between CCIs (to allow for priority traffic and/or to simplify implementation), then there may be a large delay penalty for failure.

To proceed with an analysis, some system assumptions are required. First it is assumed that no maximum number of CC_OPs per CCI exists. In many systems there may be such a maximum. Ideally permission probability (PP) would be used in such a case to limit the number of contenders so as to guarantee a reasonable probability of success within a CCI. However, the invention described can operate without PP, and illustrative examples of this invention do not require permission probability. This application will mostly assume that no limit on the number of CC_OPs in a CCI exists (which will often be the case in practice).

Another assumption is that of perfect knowledge of the number of contenders. In practice this will never be the case. However, the invention described can operate with imperfect knowledge of this input as well. An estimate of the number of contenders can be made using one of several possible algorithms.

If no knowledge of prior CCI results or contender arrival rates exists, initially assume there are no contenders. Each CCI must contain at least one CC_Op (even if there are no contenders). If data from the last CCI is available, that data is used to estimate the number of contenders. For example, if the initial estimate of the number of contenders was zero, and there was one CC_Op in the first CCI, and that CC_Op was detected as busy, there most likely was a collision. This means there are probably at least two contenders. Thus this method assumes that there are two unreceived RR frames (contenders) for each CC_OP (slot) that is detected as busy.

In addition, based on observations of traffic patterns, or existing traffic specifications, it may be possible to estimate the number of new contenders since the last CCI. For example, if it was known that the current traffic loading was resulting in approximately five new web page accesses every second (each of which would require sending an RR), and it had been 200 milliseconds since the last CCI, then the system could assume that one more RR (contender) was probably waiting for service. The contender estimate from the prior CCI would then be updated to account for the additional contender estimated.

Note that the CCI rates for different service categories (classes) can be isolated from one another. That is, by properly setting the category field in the CCI, a single category or set of categories can be serviced to the exclusion of others. For example, voice with silence suppression would require more frequent CCIs then web browsing traffic. CCIs to service the voice traffic could be sent every 10 milliseconds, while the web browsing CCIs could be sent every 200 millisecond, or even be periodic. This capability could be useful since it can be shown that larger numbers of RR (contenders) can often be serviced more efficiently than smaller numbers. Since the web browsing traffic is less time critical, it is possible to have longer intervals between CCIs for that traffic, allowing greater efficiency than would be possible if it were serviced with the voice traffic.

Given the assumptions identified so far, the question arises as to the most efficient way to service a set of contenders. However, one must first define what one means by efficient. Before that can be done, one must also define what it means to service a contender. For this application, servicing a contender is defined as correctly receiving its RR and responding with a notification of receipt in a following CC frame, or by providing implicit notification by polling the contender. Given this, efficiency can be defined as minimizing the time required to receive the RR and to notify the contender of its receipt. More efficient methods service a set of contenders in less time than less efficient methods. This time will be a random variable, so the mean time or possibly the distribution of times around that mean must be considered. For instance, rather than the mean, one could measure the time sufficient to service a contender 95% of the time in a given set of conditions.

An alternative definition to service time efficiency is bandwidth efficiency. This is the number of RRs serviced on the link divided by their occupancy of the medium. The most efficient protocol in this case would be the one that consumes the least time on the medium per a RR. The definition of medium occupancy here includes all time reserved for use by RRs exclusively, including empty and collided CC_OPs. If one discounts notification of receipt, bandwidth efficiency would roughly be equivalent to the mean of service time efficiency. However its emphasis is different. Rather then focusing on the time required to respond to a request, it focuses on making sure that bandwidth on the medium is not wasted. Bandwidth efficiency is the focus of this invention. However, it is believed that the average service time is also minimized in some sense by the invention.

Given the assumptions and definition of efficiency above, one may now start to design and analyze methods of servicing contenders. By way of prior art, one straightforward method which can be applied is to attempt to service all contenders in a single CCI. It could be desired for instance to construct a CCI where 95% of the time all contenders are serviced within the CCI. One could then measure its bandwidth efficiency as all the number of contenders serviced divided by the number of CC_OPs or slots required in the CCI.

Constructing such a CCI for a given number of contenders requires a basic understanding of probability theory and the working of some equations. Appendix A contains some key equations and calculations in this regard. The resulting efficiencies for a varying number of contenders are given in FIG. 3. The bandwidth efficiency drops significantly as the number of contenders exceeds 1. It is clear that this method has a very low bandwidth efficiency.

The key problem with the approach of using a single CCI to serve all the contenders is that there is no second chance (it is assumed there is a long time between CCIs). So we need to be very sure that we got all (or almost all) the contenders on the first shot. If we allow for multiple CCIs to be used in serving the contenders, we can then try to optimize the individual CCI for bandwidth efficiency. By concatenating enough CCIs it is possible to serve all the contenders with a reasonable probability of service. Note that if we optimize the CCIs for bandwidth efficiency, by definition they should be serving on average the most contenders possible. So it should take the least amount of time to service all the contenders. Thus (at least in a mean sense) service time is also optimized by this approach.

Optimization of CCI efficiency can be considered in several different ways. One way is on a per-a-slot (CC_OP) basis. Another way is overall within a CCI. Finally a third is overall across multiple CCI. All three will be considered here. Starting with the per-a-slot case, it should be clear that if each contender picks a slot at random, the probability of them picking a specific slot is 1/(the number of slots). Each contender contends within a slot independently. It is well known that a binomial distribution results for such a situation. It can be shown that this distribution is maximized when the number of contenders equals the number of slots. A proof of this is provided in Appendix B.

To further validate this statement, consider FIG. 4. The values for FIG. 4 are found in Appendix C. FIG. 4 clearly shows that (at least for the limited range of values considered) the probability of success is maximized when the number of slots is the some as the number of contenders. Some other interesting notes are that the peak of the curve (maximum probability of success) is lower as the number of contenders increase, and the main lobe (where the peak is) becomes broader, indicating reduced sensitivity to the number of slots.

Based solely on the per-slot data, one would expect that ideal performance is achieved when during each CCI the number of slots is set equal to the number of contenders. However this presumes that the results in each slot are independent of each other when in fact they are not. Consider the following example. If it is assumed that there are four slots, and three contenders, a value for the probability of success in a single slot could be computed as:

$$\mathrm{dbinom}\left(1, 3, \frac{1}{4}\right) = 0.4219$$

If the result for each slot was independent, the probability of success in all four slots could be computed as:

$$\text{dbinom}\left(1, 3, \frac{1}{4}\right)^4 = 0.0317$$

Of course, since there are only three contenders, there cannot possibly be four successes, and the answer must be zero. Clearly the results in different CC_OPs of a CCI are not independent. Therefore it cannot be assumed that the per-slot-solution optimizes the efficiency of the overall CCI. For the three contender, four slot case described above, per CCI efficiency (cci_eff) is actually a weighted average over the possibility of one, two and three successes in the CCI, and could be written for this case as:

$$\text{cci_eff} = \frac{(1 \cdot \text{Ps}(1) + 2 \cdot \text{Ps}(2) + 3 \cdot \text{Ps}(3))}{4}$$

Where Ps(x) is the probability of exactly x successes in the CCI. Since the distributions in each slot are interdependent, there is no reason that the single slot efficiency should be the same as the overall efficiency for the CCI. As a counter example for this, consider that if the slots were independent, there would be a finite probability for Ps(4), which would contribute to the sum. We would then expect the average efficiency for the CCI to be the same as for the single slot efficiency given that the slots are now independent. However, we already know that Ps(4) must be zero (slots are not independent). While it is possible that for the interdependent case the terms for Ps(1) through Ps(3) might be such that the average CCI efficiency is equal to the single slot efficiency, there is no reason to expect it.

Surprisingly, the overall efficiency for a CCI with interdependent distributions in each CC_OP seems to be identical to the efficiency of a single independent CC_OP. However showing this requires quite a bit of work. Consider first Appendix D as reflected in the table of FIG. 5, which presents a sample of that data for four slots and up to seven contenders. This derives formulas to compute the probability for any particular set of successes/collisions occurring between contenders given the number of slots and the collision set of interest. In Appendix E, a program is defined to use the equations in Appendix D to compute the probability for a given number of successes in a CCI given the number of contenders and slots. This program is then used to generate the probability for a given number of successes (exactly one contender in a slot) for up to 16 contenders and 16 slots.

In Appendix F, the values from Appendix E are used to compute the per CCI efficiency for cases of up to 16 slots, and 16 contenders. This efficiency is evaluated with and without the overhead of CC frames. FIG. 6 presents the efficiency data without overhead. At least for these no overhead cases, Appendix F shows the efficiency to be the some as that for a single independent slot (CC_OP) as derived in Appendix C. While this does not prove the general case, for this application the equality is assumed to hold for the values of greatest interest in this application. Since the efficiency values for the per-slot case are numerically less intensive to compute, it suggests that these equations can be used to find the per CCI without overhead efficiency values. These make it dramatically easier to evaluate the efficiency for large numbers of slots and contenders, though no demonstration of that is provided here. The important point is that the optimality of using the same number of slots as contenders holds for the per CCI without overhead result as it did for the per slot result.

Another important evaluation in Appendix F is the efficiency including overhead, as shown in FIG. 7. A CC frame is required to start the CCI, and a second CC frame may be used to report the successful RR frames back to the contenders. The second CC frame would most likely start another CCI, so in most cases only that part of the CC frame used to report the result from the prior CCI should count as overhead. There is no exact way to evaluate the overhead as it varies with several of the parameters in 802.11, such as the physical layer (PHY) data rate, as well as the particulars of how the CC/RR protocol is employed.

While an exact estimate of the CC frame overhead is difficult, a good approximation is not. A CC frame's size varies with the number of successful RRs being reported from the prior CCI and is always at least slightly larger than a RR frame. However, to a first order of approximation, CC and RR frames are about the same size. Thus, the overhead of a CC frame is roughly the size of a "slot" being used in the analysis. This assumption implies that the overhead may be estimated as between one and two slots per a CCI. It is believed that the overhead value is generally closer to one slot rather than two slots.

This being said, consider the data in FIGS. 7 and 8. Starting with FIG. 7 it should be clear first off that the optimum operating point has shifted from the data in FIG. 6. Instead of slots=contenders being optimum, slots=contenders+1 is optimum. Also note that without accounting for overhead, the lower the number of contenders the more efficient. So without overhead one could always service two contenders more efficiently than any other number of contenders. In FIG. 7 the highest efficiency numbers are for 16 contenders. Similarly for FIG. 8, it is more efficient to use slots=contenders+1 until a value of nine contenders is reached. From that point forward, it is more optimum to use slots=contenders+2.

Clearly the optimum operating point is bounded between the data on FIGS. 7 and 8. A more exact analysis is possible if the specifics of the PHY and CC/RR usage are known. A system could compute the exact efficiency for its operating point given this knowledge and the table of efficiencies without overhead when it begins operation. While the formulas in Appendices D-F are difficult, a much simpler set (based on the assumption that without overhead the formulas in Appendix C work for per CCI efficiency) can be found in Appendix G. With enough processing power, the formulas could even compute the optimum efficiencies needed in real time based on an estimate of the number of contenders and current overhead. It could first estimate the number of contenders. It would then start with slots=contenders, and increment the number of slots one by one till it found the maximum efficiency. The number should always be within one to two slots of slots=contenders.

One could ask, "is it possible for the optimum value to drift more then one to two values away from slots=contenders?". The equations in Appendix G were used to look out to values up to 50 contenders. These numbers are much larger than anything one would normally expect to be seen in an 802.11 infrastructure. Even for these large numbers, the optimum point was slots=contenders+1 for one slot overhead, and slots=contenders+2 for two overhead slots.

Another question which could be asked is "does the efficiency with overhead ever peak for a particular number of contenders?" Clearly without overhead the efficiency peaks at 50% for two contenders, and then seems to decrease forever. One might expect that with overhead the efficiency would initially increase, and then eventually start to decrease as with the no overhead case, causing a peak where the number of contenders is optimum. The answer is that there is no peak. At the end of Appendix B, there is a small proof that shows without overhead, the efficiency limit as the number of contenders goes to infinity is exp (−1) or roughly 0.3679. So while the no overhead solution decreases forever, it never drops below 36.79%. For the overhead solution, as the number of contenders goes to infinity, the overhead becomes less and less significant (since it is constant even as the number of contenders increase). So the overhead solution also approaches the 36.79% solution. However, for small numbers of contenders the overhead hurts the efficiency a lot and drags it below the 36.79% point. So while the no overhead solution approaches 36.79% from above, the overhead solutions approach it from below. However they do not ever reach it, so they never peak (at least for practical values of the parameters).

Yet another question concerns the robustness of the optimum solution. It turns out that if one uses the simple algorithm for estimating contenders given earlier, one is more likely to underestimate contenders than over-estimate. This is because if more then two contenders collide, it looks the same to the system as if two contenders have collided. Since it is normally more likely that it is a two-way collision than a three-way or more collision, it makes sense to assume only two contenders are present. Fortunately if we set the number of slots to the "optimum" operating point, it is fairly robust to underestimates. As seen clearest from the data in FIG. 7, underestimating the number of contenders by a small number and using the optimal number of slots for that value does not carry a large penalty in efficiency.

So far we have discussed estimating bandwidth efficiency at two levels within a single slot, and within a single CCI. The next level is efficiency over multiple CCI. If we presume a given number of pending RRs, we can ask what is the most efficient mechanism to convey them over multiple CC. The problem of course is that, due to collisions, not all RR may be successful during a given CCI. This means that even if no further RR arrive, it may take multiple CCI to convey all the desired RR frames. The question is what is the optimum strategy for conveying the RR over multiple CCI, and what is the efficiency.

It seems obvious that if every CCI uses the optimum number of slots for the number of contenders believed in existence then the overall efficiency is maximized. At least that is the assumption for the invention in this disclosure. Appendix H analyzes the issue of efficiency over multiple CCI with and without overhead. FIG. 9 provides some overall efficiency values. They are as expected. Without overhead, the efficiency continuously decreases as the number of contenders increases. Also the efficiencies are always higher than for the single CCI case for a given number of contenders. This is because, when collisions occur, contenders are then serviced from a smaller contender pool. Thus, they can be served more efficiently. With overhead, the efficiencies constantly increase since the larger the contender pool, the more efficiently it is serviced. However, the efficiency for the same number of contenders here is less than for the optimum single CCI since, if collisions occur and only some contenders are satisfied, the remaining contenders are serviced from a smaller contender pool which will be serviced less efficiently.

So finally, it is possible to describe an algorithm that is designed to realize the optimum efficiency for the CC/RR protocol which takes into account a method 1000 of estimating the number of contenders, as described in FIG. 10. The method is initiated in step 1001 and a test is performed in step 1003 to determine if the knowledge of prior CCI or contender arrival rates is known. A "no" condition transfers the process to step 1005 where the contender estimate is set to "0", after which the method ends in step 1011. A "yes" condition for step 1003 transfers the process to step 1007 where the contender estimate is set to two times the number of busy slots in the last CCI. In step 1009, the contender estimate is increased by the predicted contender arrivals since the last CCI, where the predicted contender arrivals is calculated using knowledge of the applications running or past history. For instance, if an average of 20 RRs/second have been received over the last five minutes, and it has been 100 milliseconds since the last CCI, it may be assumed that approximately two RRs are currently queued for transmission. The contender estimate is adjusted accordingly, and the process ends in step 1011.

FIG. 11 provides a flow chart of a method for optimally serving contenders in CC/RR protocols 1100, which is only one possible realization of the invention. The realization described in this flowchart is not the only one that would be in keeping with the spirit of this invention. FIG. 11 is intended to be illustrative and not limiting. First it should be clear that the optimum solution needs to be iterative. It will not be possible to guarantee that all contenders are serviced in a single CCI. So multiple CCI will be required. When a new resource reservation service cycle (set of CCIs) is initiated, it may be desired to track when the cycle can be ended. If there are no more contenders, we probably want to end the cycle.

In FIG. 11, the method is initiated in step 1101 and a counter is set to 0 in step 1103 for the number of Empty_CCIs in the CCI interval 210 shown in FIG. 2A. An estimate of the number of contenders is made in step 1105 using, for example, the method of FIG. 10. A test is performed in step 1107 to determine if the number of contenders is less than 1. A "yes" initiates step 1109 and every time a CCI with no contenders occurs, the value Empty_CCI is incremented. A "no" condition initiates step 1111 and every time a CCI occurs with contenders it is reset to zero. Both steps 1109 and 1111 transfer to step 1113 in which a test is performed to determine if the number of Cntndrs is greater than the Max_Cntndrs. The variable Cntndrs tracks the estimated number of contenders. The variable Cntndrs>Max_Cntndrs ensures that the number of contenders is limited, so as to limit the maximum number of CC_OPs (slots) in a CCI. A "yes" condition calculates a permission probability in step 1115 as the Max_Cntndrs/Cntndr and sets Cntndrs=the Max_Cntndr. A "no" condition for step 1113 sets the permission probability as 1 in step 1117. Both steps 1115 and 1117 transfer the method to step 1119 for determining the optimum CC_OPs slots. However, because the concept of permission probability is used in this realization, and the Determine Optimum CC_OPs step 1119 is loosely specified, it is easier to control the number of contenders directly. The parameter Perm_Prob is transmitted in the CC frame and used to control the number of contenders so that the ratio of contenders to slots remains optimum in overload conditions. It is normally set to 1 (so that all contenders will contend). However, when the number of CC_OPs must be limited, permission probability is set to the ratio of Max_Cntndrs/Cntndrs to reduce the contender pool for optimum performance on the medium. Note that the value Max_Cntndrs must be selected to map to the maximum number of CC_OPs when the Determine Optimum CC_OPs block is executed. In step 1121 a test is performed to determine if the number of CC_OPs slots is less than 1. The parameter CC_OPs tracks the number of CC_OPs in a CCI. CC_OPs could have been monitored directly, and a maximum applied to it. This would still be within the spirit of the invention. Also as seen in FIG. 11, there must always be at least one CC_Op in a CCI for the realization shown. The actual standard allows for the possibility of a CCI with no CC_OPs, and such a practice would still be within the spirit of this invention. A "yes" condition sets the number of CC_OPs to 1 in step 1123. A "no" condition transfers the process to step 1125 in which a test is performed to determine whether the number of Empty CCI slots is less than the Max Empty_CCI slots. A "no" condition ends the method in step 1127. A "yes" condition initiates step 1129 to restart the method. If the parameter Empty_CCI ever reaches the value Max_Empty_CCI, the service cycle also ends. Other ways of tracking/initiating the end of a service cycle may also be used and still would be within the spirit of this invention. After the CCI is conducted, another check is performed in 1131 to see if any RRs were received. If so, flow proceeds to step 1103 where Empty-CCI is reset. Otherwise, flow proceeds to 1105.

A crucial element of the invention is the step 1119 titled "Determine Optimum CC_OPs". The term optimum is used very loosely here, as there are degrees of optimality all of which would be considered within the spirit of the invention. As a first approximation, this block might simply set CC_OPs=Cntndrs. This is actual a really good approximation of the optimum and is considered within the spirit of the invention. However, accounting for the overhead can lead to a slightly more optimal and more robust solutions. As noted, the overhead depends on the specifics of the PHY and CC/RR implementation. In general it is believed to be within one to two CC_OPs but for most implementations is closer to one.

As an example, consider the following calculations for the basic 802.11 Direct Sequence (DS) PHY running at 1 MBPS. MAC frame sizes are 144 bits for a RR, 144 bits per CC+16 bits per feed back in each CC. At 1 MBPS this translates to 144 microseconds for the MAC portion of the RR frame, and 144 microseconds+16 microseconds for each feedback in a CC frame. The PHY overhead on all frames at this rate is 192 microsecond. The current protocol requires a Short Inter-Frame Space (SIFS) before the RR in each CC_Op which is 10 microseconds, and a PCF Inter-Frame Space (PIFS) is required before each CC frame which is 30 microseconds. This means that a RR requires 346 microseconds, and each CC without feedback requires 366 microseconds, and each feedback is 16 microseconds. Thus without feed back each CC represents 1.06 CC_OPs overhead. For back-to-back CCIs it may be possible to use a SIFS before all CCs but the first CCs without feedback which used a SIFS would be exactly one CC_OP overhead.

As for feedback, only successful RRs would require a feedback, and some of those might get implicit feedback through direct polling. If every CC_OP contained a successful RR which required feedback, the total additional overhead would be 4.6%. Since at best only 50% of the RRs are expected to be successful, this value would be capped around 2.3% and in general would be less. If back-to-back CCI are used, typically there will only be one CC frame overhead. Thus a total overhead of 1.09 CC_OPs is expected. The final CCI may require an additional CC frame and that entire CC frame should be counted as overhead, However, it may be permissible to delay feedback till the next service cycle, in which case no additional CC frame penalty is incurred. Also as noted, feedback may be done implicitly by simply polling the STA that sent the RR.

If desired, the overhead could simply be approximated as one CC_Op, in which case the block titled "Determine Optimum CC_OPs" would set CC_OPs=Cntndrs+1. Note that particularly if the method used to estimate the contenders tends to underestimate, it is useful to use Cntndrs+1. This would be within the spirit of the invention. However if an exact estimate was known for the overhead in a particular implementation (say 1.09 CC_OPs for the example provided above), it is possible to generate a table such as in FIGS. 6-9 tailored for that overhead. This will result in cases where the optimum value is CC_OPs=Cntndrs+1, but for some values of Cntndrs the correct value is CC_OPs=Cntndrs+2. In general the gain from getting this complex is very small (<1% efficiency). However it would be within the spirit of the invention. Similarly, it is possible that because of how the use of the CC/RR protocol is configured, the overhead is always 2 CC_OPs (2 CCs used for every CCI) and possibly slightly larger with feedback. And because the method used may tend to underestimate the number of contenders, the block titled "Determine Optimum CC_OPs" would set CC_OPs=Cntndrs+2. All of this is considered within the spirit of the invention. However, it is believed the preferred embodiment will generally be CC_OPs=Cntndrs+1. Also, as already noted, the PHY characteristic may be dynamic, and an implementation might try to calculate the optimum value in real time based on the formulas provided in this disclosure. This too is considered to be within the spirit of the invention.

Finally, something not dealt with till now is the fact that the number of contenders is actually a random variable, and the described embodiments to this point have treated this random variable as a given constant. The block "Determine Optimum CC_OPs" could use more sophisticated statistical methods to refine the value of CC_OPs chosen even further than is described here. However, any value found will be close to the value of CC_OPs=Cntndrs, and such a method would be considered to be within the spirit of this invention.

Appendices incorporated into the specification include:

Appendix A: Number of Slots Required to Satisfy All Contenders A Given Percent of the Time;

Appendix B: Maximizing the Probability of One Success with the Binomial distribution;

Appendix C: Table for per Slot Probability of Success Given the Number of Contenders and the Number of Slots;

Appendix D: Probability of a given number of successes and multi-contender collisions for a single CCI;

Appendix E: Table for Probabilities for a given number of Successes in a CCI given the total Number of Contenders and Number of Slots;

Appendix F: Computation of Overall Efficiency during CCI; and

Appendix G: Efficient Equations for Computing per CCI Efficiency with Overhead.

While the invention has shown and described in terms of a preferred embodiment, various changes can be made therein without departing from the spirit and scope of the invention, as defined in the appended claims, in which:

I claim:

1. A method for optimally serving stations on Wireless local area networks using a Controlled Contention/Resource Reservation protocol of the IEEE 802.11e standard comprising:

(a) setting a counter Empty_CC to 0;

(b) estimating the number of contenders according to prior results for the Contention Control/Resource Reservation protocol and observed traffic patterns;

(c) conducting a test to determine if the number of contenders is less than 1;

(d) determining Optimum Controlled Contention Opportunities (CC_OPs) and approximating a number of slots required to report results to a station as 1 or 2 slots;

(e) performing a test CC_OPs>1, wherein a "yes" condition sets CC_OPs to+1 and a "no" condition transfers to step (f); and (f) conducting a test: Empty_CCI<Max_Empty_CCI, wherein Empty_CCI is a number of empty Controlled Contention Intervals (CCIs), wherein Max_Empty_CCI is a selected number of Empty_CCIs, and wherein a "yes' condition transfers to step (b).

2. The method of claim 1 further comprising:

(g) setting CC_OPs=number of station contenders+1.

3. The method of claim 1 further comprising:

(g) setting CC_OP=number of station contenders+2.

4. The method of claim 1 flitter comprising (g) calculating a Permission Probability where: if contenders>max contenders, then Permission Probability=Max_Cntndrs/Cntndrs and Cntndrs=Max_Cntndrs; else a "no" condition setting a Permission Probability=1; else leaving cntndrs as is; and (h) resetting the Empty_CCI to 0 and a "yes" condition incrementing the Empty_CCI counter.

*5. A method for serving stations on Wireless LANs using a Controlled Contention/Resource Reservation protocol of the IEEE 802.11e standard comprising:*

*(a) transmitting a Contention Control (CC) frame that specifies a time period for at least one Controlled Contention Interval (CCI) during which station contenders can transmit Resource Reservations (RRs) detailing their bandwidth needs, the at least one Controlled Contention Interval (CCI) having a selected number of Controlled Contention Opportunities (CC_OPs) or slotted intervals; and*

*(b) receiving Resource Reservations (RRs) from one or more of the station contenders during respective ones of the Controlled Contention Opportunities (CC_OPs) or slotted intervals;*

*(c) wherein the number of the Controlled Contention Opportunities (CC_OPs) or slotted intervals within the at least one Controlled Contention Interval (CCI) is equal to one of a) an estimate of the number of station contenders, b) an estimate of the number of station contenders+1, or c) an estimate of the number of station contenders+2.*

*6. The method of claim 5 wherein the Contention Control (CC) frame further specifies a Permission Probability (PP).*

*7. The method of claim 5 wherein the Contention Control (CC) frame includes a set of flags indicating Traffic Categories (TC) that may compete for the Controlled Contention Opportunities (CC_Ops).*

*8. The method of claim 5 wherein said at least one Controlled Contention Interval (CCI) comprises two or more concatenated Controlled Contention Intervals (CCIs) each having the same number of Controlled Contention Opportunities (CC_OPs) or slotted intervals.*

*9. Apparatus for serving stations on Wireless LANs using a Controlled Contention/Resource Reservation protocol of the IEEE 802.11e standard comprising:*

*(a) transmitting apparatus which transmits Contention Control (CC) frames each initiating at least one specified time interval called a Controlled Contention Interval (CCI);*

*(b) receiving apparatus which receives Resource Reservations (RRs) detailing bandwidth needs from station contenders during the Controlled Contention Interval (CCI); and*

*(c) installing apparatus which installs in each CC frame several parameters for contention control purposes, one of said parameters specifying a number of Controlled Contention Opportunities (CC_OPs) or slotted intervals that are included within the Controlled Contention Interval (CCI), the Resource Reservations (RRs) being transmitted within respective ones of the Controlled Contention Opportunities (CC_OPs) or slotted intervals;*

*(d) wherein the number of Controlled Contention Opportunities (CC_OPs) or slotted intervals of a Controlled Contention Interval (CCI) is equal to one of a) an estimate of the number of station contenders, b) an estimate of the number of station contenders+1, or c) an estimate of the number of station contenders+2.*

*10. The apparatus of claim 9 wherein at least one of the Contention Control (CC) frames initiates two or more concatenated Controlled Contention Intervals (CCIs) each having the same number of Controlled Contention Opportunities (CC_OPs) or slotted intervals.*

* * * * *